United States Patent Office 3,377,440
Patented Apr. 9, 1968

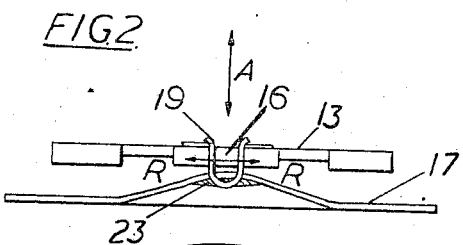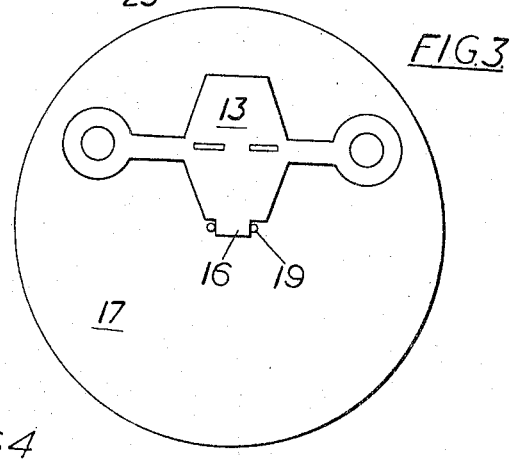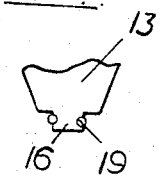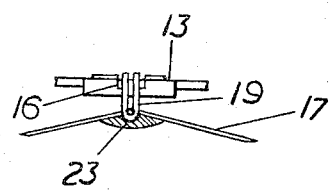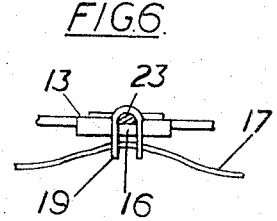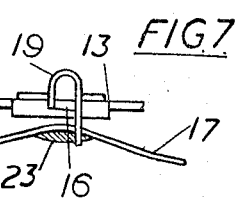

3,377,440
ROCKING ARMATURE RECEIVERS
James Samuel Paterson Roberton, Whetstone, and Leslie Eugene Basil Dymoke Bradshaw, Edgware, England, assignors to International Standard Electric Corporation, New York, N.Y., a corporation of Delaware
Filed Feb. 10, 1965, Ser. No. 431,541
11 Claims. (Cl. 179—115)

This invention relates generally to electro-mechanical vibratory devices, and more particularly, to electroacoustic devices, such as rocking armature receivers.

Rocking armature receivers that are well known in the art have a fixed rigid connection between the armature and the acoustic diaphragm. This type of coupling, however, induces strains in the diaphragm. Accordingly, an object of the present invention is to provide an electromechanical vibratory device in which two cooperating parts of the moving system, a driving member and a driven member, are mounted on different parts of the supporting structure. The parts are connected by a resilient intermediate member which is fixed to either the driving member or the driven member and is in frictional contact with the driven member or the driving member respectively. The limiting friction at the point or points of frictional contact is set to cause the intermediate member to transmit the highest required vibratory force between the driving member and the driven member and nonetheless slip under a static force along the line of force transmission between the driving member and driven member. Without such slippage, either or both the driving and driven parts, would experience severe displacement from their equilibrium position.

Another object of the invention is to provide an electroacoustic device including an acoustic diaphragm and an electromechanical transducer portion mounted on different parts of the supporting structure. The diaphragm and the transducer portion are connected by an intermediate resilient member which is rigidly fixed to the diaphragm or the transducer portion and is in frictional contact with the transducer portion or the diaphragm, respectively. The value of limiting friction at the point or points of frictional contact being marginally above the highest vibratory force required to be transmitted through the intermediate resilient member, but below the static force which would cause severe displacement of the diaphragm and/or the transducer portion from their equilibrium positions.

Embodiments of the invention will now be described, by way of example, as applied to an electroacoustic device of a rocking armature telephone receiver type. The description is with reference to the accompanying drawings in which:

FIG. 2 shows an elevation of the assembled armature, diaphragm and intermediate connecting member;

FIG. 3 shows a plan view of FIG. 2;

FIG. 4 shows a variation of the location of the intermediate connecting member as shown in FIG. 3, and FIGS. 5, 6 and 7 are elevations showing further modifications of the intermediate connecting member and its location according to the present invention.

Figure 1:
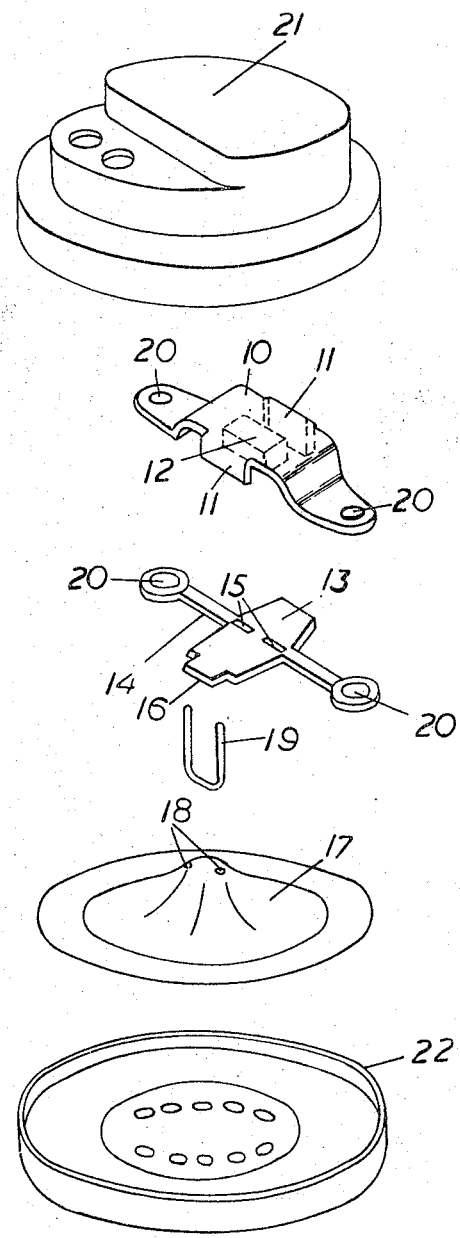
FIG. 1 shows an exploded perspective view of the inventive rocking armature receiver showing a static magnetic assembly, an armature, and an acoustic diaphragm.

Referring now to FIG. 1, the static magnetic assembly 10 is made from a cruciform plate of magnetic material with two limbs bent downwards at right angles to the rest of the plate, to form outer pole pieces 11 which go into coil bobbins (not shown) in the final assembly of the device. The middle of the plate carries a magnet 12 disposed centrally between the pole pieces 11.

The armature consists of a central portion 13 (the armature proper) and torsion arms 14. The central portion 13 has a ridge 15 extending partly along the vibrational axis of the armature. This ridge provides a roller bearing upon which the armature 13 rocks on the magnet 12 in the assembled device. At one end of the armature proper 13 is a lug 16.

The acoustic diaphragm 17 is preferably basically conical, but flared with curved sides convex towards the axis of the cone, and merging into a flat outer flange. It may be made of any light material such as an alloy of aluminum. The diaphragm has two holes 18 at equal small distances from its center.

A U-shaped wire spring 19 acts as a resilient intermediate connecting member between the armature 13 and the diaphragm 17. In the assembled rocking armature receiver, the wire 19 is rigidly fixed at the closed end of the U to the diaphragm 17, and the two arms of the U project through the holes 18 in the diaphragm with the open ends embracing the lug 16 on the armature 13 with balanced spring pressures.

In the assembled rocking armature receiver the whole electromagnetic unit, consisting of the armature 13 and the static magnetic assembly 10 with audio frequency coils over the pole pieces 11, is held by two screws through corresponding holes 20 the capsule cover 21, and the diaphragm 17 is clamped to a seating in the front cover 22. The capsule cover 21 and the front cover 22 are only shown in outline in FIG. 1. It is unnecessary to give further details of these two parts and other details of the capsule assembly which are not shown in FIG. 1, for the purpose of explaining the present invention.

Referring now to FIG. 2, the wire 19 is rigidly fixed at the closed end of the U to the diaphragm 17 by a cement 23 such as "Araldite"; any other suitable hard setting adhesive material could be used. The two arms of the U project through the holes 18 and embrace the lug 16 on the armature 13 with balanced spring pressures.

The spring pressures are of a value determined by the wire dimensions and the deflections of the arms of the spring. The spring pressures produce a determined force of reaction at the points of frictional contact as shown in FIG. 2, and so a determined value of limiting friction. This value of limiting friction sets an upper limit to the static force which can be transmitttd between the armature and the diaphragm. This upper limit is chosen to be marginally above the highest vibratory force required to be transmitted between the armature and the diaphragm, but below the static force which would cause undesirable displacement of the armature and the diaphragm from their equilibrium positions; or more particularly which would severely displace the armature from balance. In the telephone transducer described, the maximum vibratory amplitude is very small compared with the airgaps in the system, whereas static deflections which cause disturbance would have to be an appreciable fraction of the airgap length.

To control the value of limiting friction, in practice it is desirable to hold the force of reaction between the wire 19 and the lug 16, within certain limits. Sufficiently close limits can be achieved by designing the U-shaped spring 19 so that its arms are resilient in a direction substantially normal to the line of force transmission through the spring 19, that is normal to the direction of the double headed arrow A in FIG. 2. Thus, for a range of positions of rest of the wire 19 on the lug 16, the force of reaction remains substantially constant.

Instead of having both arms of the U-shaped wire resilient as described above, it would be possible to achieve the desired result with only one of the arms made resilient.

FIG. 3 shows, in particular, the positions of rest of the wire 19 on the lug 16. FIG. 4 shows an alternative positioning where the lug 16 is notched for location of the wire 19. One advantage of the frictional drive between the armature and diaphragm as described so far is that there appears to be a hinging effect. That is to say, the connecting member 19 tends to hinge at the points of frictional contact, and this tends to reduce the radial distortion of the diaphragm. There appears to be a degree of hinging with the location of the wire 19 as in FIG. 3 or in FIG. 4, and this is still present if the notches in the armature lug as shown in FIG. 4 are enlarged beyond tht exact size required to fit the wire.

FIG. 5 shows the U-shaped wire spring 19 still rigidly fixed to the diaphragm 17 as in FIG. 2, but with the two arms bearing on the inside of a slot in the armature lug 16, rather than embracing it. The arms of the spring 19 could alternatively project through a hole in the lug 16. The spring is tensioned accordingly to give forces of reaction at the points of frictional contact in the opposite directions to those shown in FIG. 2.

FIG. 6 shows that the U-shaped spring 19 may be located with the closed end of the U on the armature lug rather than on the diaphragm. The spring 19 is rigidly fixed to the armature lug 16 and the arms are in frictional contact with the diaphragm within the two holes 18.

In practice, it has been found that this arrangement is less satisfactory because of the compliance of the diaphragm near the point of engagement with the wires; this causes some loss of transmission at higher frequencies.

FIG. 7 shows that the spring 19 may be J-shaped rather than U-shaped. The spring 19 is fixed at the end of the long arm of the J to the diaphragm 7 through one hole 18 therein, with the two arms near the closed end of the J embracing the lug 16 on the armature.

In all the embodiments of the invention described above it will be appreciated that a formed strip could be used instead of a wire for the U-shaped or J-shaped spring 19.

A U-shaped or J-shaped spring has been described above, which provides two points of frictional contact either with the armature or the diaphragm. The invention, however, is to be understood as not necessarily limited to using these shapes of resilient member for the frictional drive between tht armature and diaphragm. It is envisaged that a resilient member could be used which has frictional contact at only one point; or again a multipronged resilient member which has frictional contact at more than two points.

The embodiments described above have been in respect of a rocking armature telephone receiver. It will be appreciated that the invention may be applied to other kinds of transducers, for example, as a receiver for purposes other than telephony or as a transmitter for telephony or any other such purpose.

Moreover, the electromechanical transducer portion need not necessarily be an electromagnetic unit as described above, but some other form of electromechanical transducer unit.

Furthermore, the invention is not to be limited to electroacoustic devices since it is envisaged that it could extend to other forms of electromechanical vibratory devices in which two cooperating parts of the moving system, a driving member and a driven member, are mounted on different parts of the supporting structure.

It is to be understood that the foregoing description of specific examples of this invention is made by way of example only and is not to be considered as a limitation on its scope.

We claim:

1. An electromechanical vibratory device comprising a driving member and a driven member, resilient means for coupling said driving and driven members, means for fixedly connecting said resilient means to said driving member, means for frictionally connecting said resilient means to the driven member, and said frictional connecting means having a value of limiting friction at the frictional contact being such that the said resilient means will transmit the highest required vibratory force between the driving member and the driven member, but will slip under a static force along the line of force transmission between the driving member and driven member.

2. An electromechanical transducer device comprising a back cover and a front cover, a static magnetic assembly mounted on said back cover, a rocking armature member associated with said magnetic assembly, an acoustic diaphragm member mounted on said front cover, and resilient means for interconnecting said members, means for rigidly connecting said resilient means to one of said members, means for frictionally connecting said resilient means to the other of said members, said frictionally connecting means being such that said resilient means will transmit the highest required vibratory force between the members, but will slip under a static force along the line of force transmission between the members.

3. In the device of claim 2 wherein said means for connecting said resilient means to said diaphragm member includes two holes, one of said holes on either side of the center of said diaphragm member.

4. In the device of claim 3 wherein said means for connecting said resilient means to said armature member includes a projecting lug on said armature member.

5. In the device of claim 4 wherein said resilient means is U-shaped, having a closed end and two arms, wherein said means for connecting the said resilient means to said diaphragm member includes said closed end, juxtaposed to said diaphragm member with said arms projecting through said holes, wherein said means for connecting the said resilient means to said armature member includes said two arms passing through said holes and embracing said projecting lug, and wherein at least one of said arms is resilient in a direction substantially normal to the line of force transmission through said resilient means.

6. In the device of claim 4 wherein said resilient means is J-shaped, having a closed end and two arms, with one of said arms longer than the other of said arms, wherein said means for connecting said resilient means to said diaphragm member includes said longer arm inserted into one of said holes and contiguous to said diaphragm, wherein said means for connecting said resilient means for said armature member includes said two arms near said closed end embracing said projecting lug, and wherein at least said longer arm is resilient in a direction substantially normal to the line of force transmission through said resilient means.

7. In the device of claim 4 wherein said resilient means is U-shaped having a closed end and two arms, wherein said means for connecting the resilient means to said diaphragm members includes said arms inserted in said holes and contiguous to said diaphragm member, wherein said means for connecting the said resilient means to said armature member includes said two arms near said closed end embracing said projecting lugs and wherein at least one of said arms is resilient in a direction substantially normal to the line of force transmission through said resilient means.

8. In the device of claim 4 wherein said resilient means is J-shaped, having a closed end and two arms, with one of said arms longer than the other of said arms, wherein said means for connecting said resilient means to said diaphragm member includes said closed end and said arms projecting through said holes, wherein said means for connecting said resilient means to said armature member includes said longer arm juxtaposed to said projecting lug and wherein at least said longer arm is resilient in a direction substantially normal to the line of force transmission through said resilient means.

9. In the device of claim 2 wherein said means for rigidly connecting said resilient means to one of said members includes hard setting glue.

10. In the device of claim 4 wherein said projecting lug has notches for receiving said resilient means.

11. In the device of claim 4 wherein said projecting lug has a slot therein for receiving said resilient means.

References Cited

UNITED STATES PATENTS 1,683,178  9/1928  Gibbs _____ 179—115

KATHLEEN H. CLAFFY, *Primary Examiner.*

A. A. McGILL, *Assistant Examiner.*